United States Patent [19]

Tilby

[11] 4,212,616

[45] Jul. 15, 1980

[54] APPARATUS FOR FORMING BOARDS FROM PLANT FIBERS

[75] Inventor: Sydney E. Tilby, Victoria, Canada

[73] Assignee: Intercane Systems, Inc., Windsor, Canada

[21] Appl. No.: 932,545

[22] Filed: Aug. 10, 1978

[51] Int. Cl.$^2$ .................... A01N 9/00

[52] U.S. Cl. .................... 425/256; 425/308; 425/338; 425/339; 425/404

[58] Field of Search .................... 425/256, 308, 404, 338, 425/339

[56] References Cited

U.S. PATENT DOCUMENTS

| | | | |
|---|---|---|---|
| 3,312,999 | 4/1967 | Greten et al. | 264/120 |
| 4,025,278 | 5/1977 | Tilby | 425/404 |

*Primary Examiner*—Donald J. Arnold
*Assistant Examiner*—James R. Hall
*Attorney, Agent, or Firm*—Burns, Doane, Swecker & Mathis

[57] ABSTRACT

A mobile forming station is provided which longitudinally orients plant fibers and compresses them into slugs. A plurality of bonding stations each include a plurality of chambers selectively positionable in alignment with an ejector of the forming station to receive slugs of fibers. Once the chambers are filled with slugs, a bonding substance borne by the fibers is cured to unite the fibers. The chambers are defined by spaced platens which are movable as a unit to sequentially align the chambers with the ejector of the forming station. The ejector includes a tubular nose which enters the chamber as the fibers are inserted to ensure that the slugs, after insertion, are of uniform density. The platens are converged to compress the slugs within the chambers. The platens are mounted on a movable carrier which is displaced away from the forming station each time that a slug is inserted into the chamber against a rear compression wall of the chamber. Means are provided for exerting an adjustable resistance to displacement of the carrier to regulate the intensity of the compressive forces, and thus the density of the board. The carrier may comprise a rotary drum carrying sets of platens in circumferentially spaced relation. The forming station can be movable relative to the bonding stations so that as curing occurs at one bonding station, another bonding station is serviced.

18 Claims, 13 Drawing Figures

Fig. 3
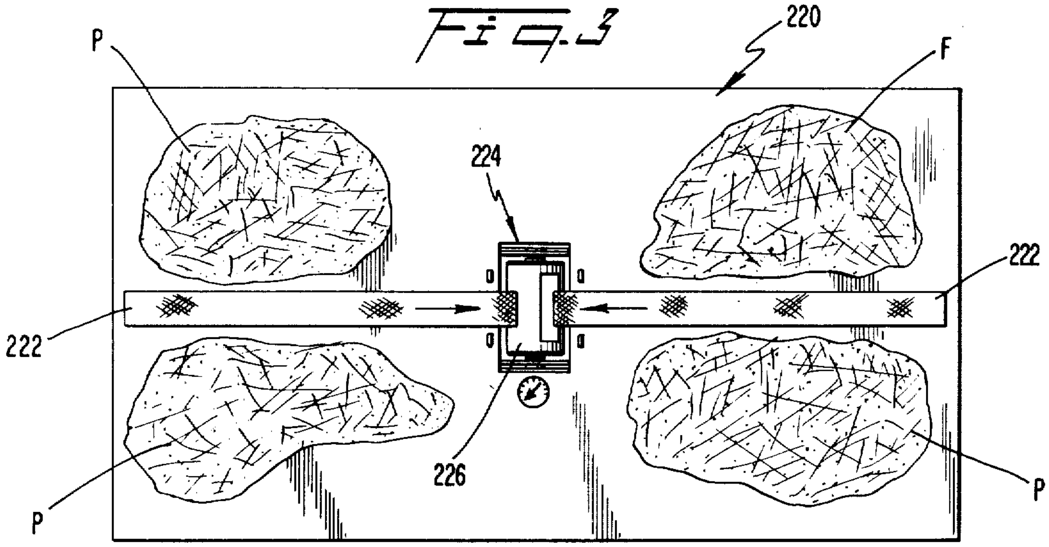
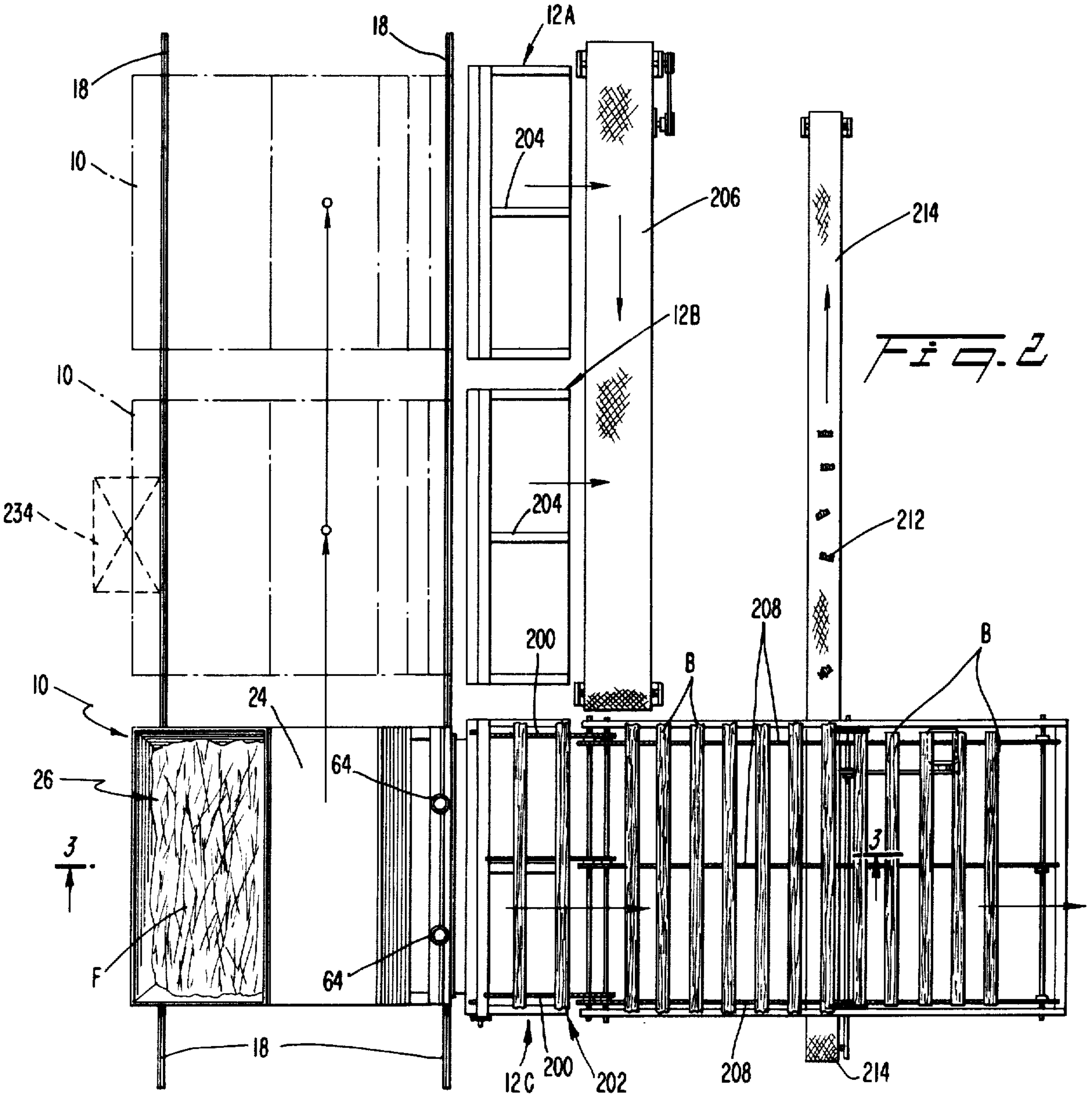
Fig. 2

Fig. 10
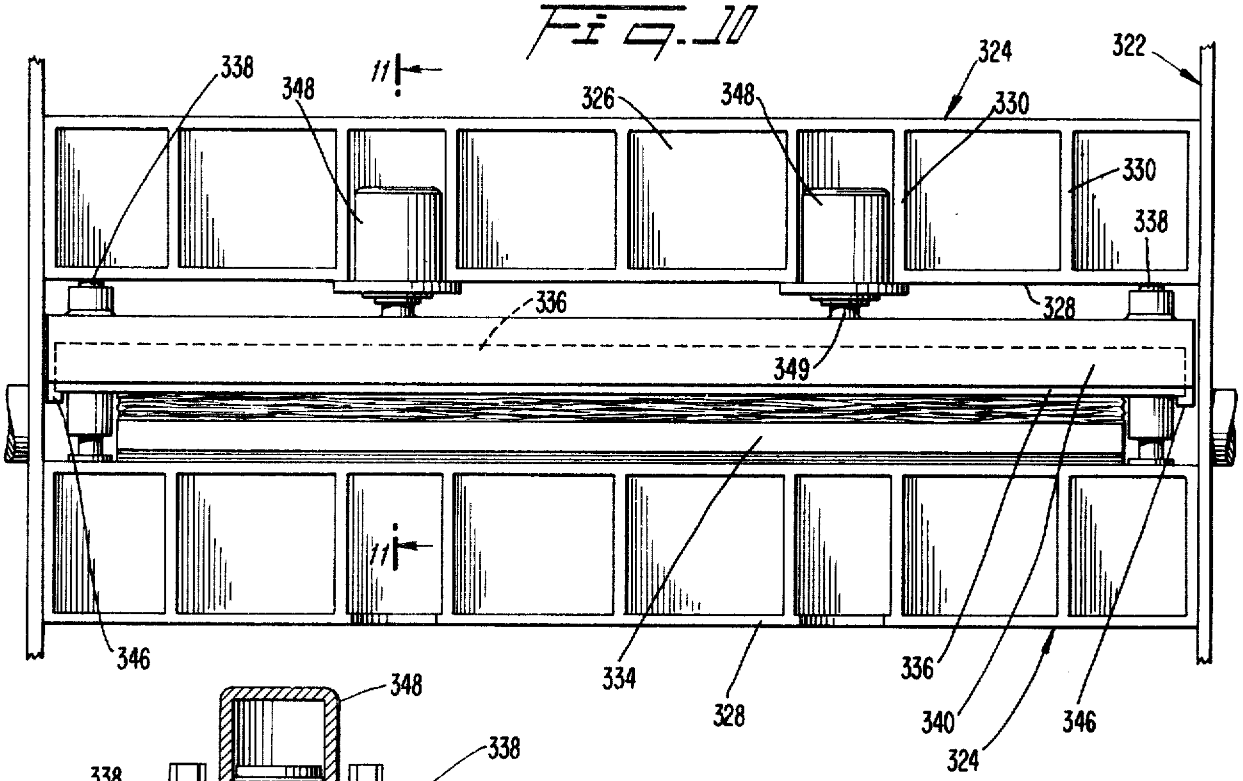
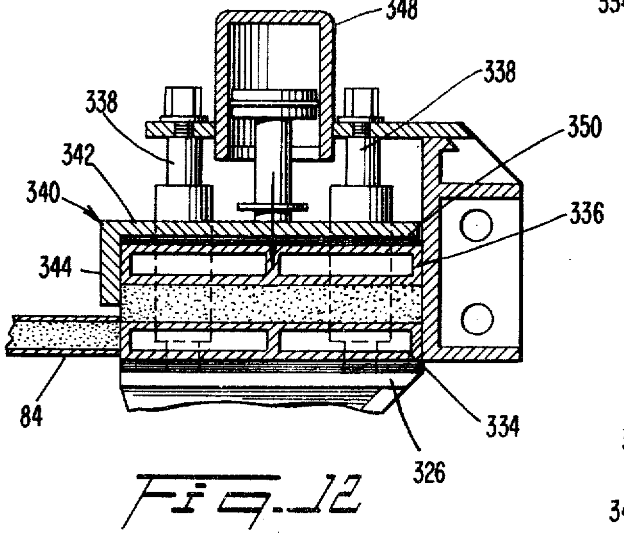
Fig. 12
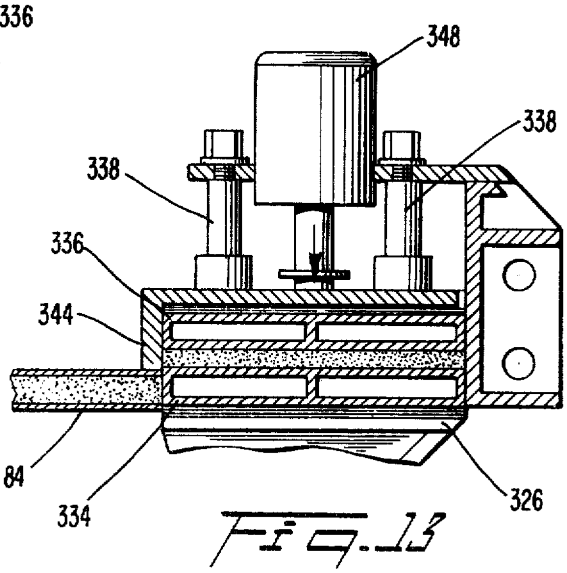
Fig. 13

APPARATUS FOR FORMING BOARDS FROM PLANT FIBERS

BACKGROUND AND OBJECTS OF THE INVENTION

This invention relates to an apparatus for the fabrication of board-like products from plant fibers.

Proposals have been heretofore made relating to the formation of board-like products from plant fibers, as demonstrated by the following U.S. Patents Nos.: 2,592,470 issued to Ryberg on Apr. 8, 1952; No. 2,648,262 issued to Croston et al on Aug. 11, 1953; No. 2,717,420 issued to Roy on Sept. 13, 1955; No. 2,853,413 issued to Christian on Sept. 23, 1958; No. 3,164,511 issued to Elmendorf on Jan. 5, 1965; and No. 4,025,278 issued to the present inventor on May 24, 1977. These proposals include the steps of selectively orienting the fibers forcing the fibers through an elongate extrusion-like passage in which they are compressed together, and curing a binder material such as a résin borne by the fibers to form a matrix which unites the fibers. The proposals suggest the utilization of various types of plant fibers, such as wood, peat moss, straw and sugarcane for example.

In the fabrication of board products which simulate natural wood boards in strength and appearance, it is necessary to align the fibers longitudinally and to compress the fibers together in a manner creating a generally uniform density throughout the length and width of the board. This has been difficult to achieve in the extrusion passages of the above-referenced patents, especially in a manner rapid enough to be commercially feasible.

It is, therefore, an object of the present invention to present a new approach to the art of forming plant fibers into boards.

It is another object of the invention to provide novel apparatus for forming board-like products from the fibers of plants.

It is a further object of the invention to provide such apparatus which solve problems such as those discussed previously and are adapted to high rate commercial production.

It is still another object of the invention to provide a platen assembly containing spaced platens which define fiber-receiving chambers therebetween, which assembly can be indexed to align successive chambers with a fiber insertion mechanism.

It is a further object of the invention to provide novel apparatus for orienting plant fibers in parallel relationship.

It is another object of the invention to provide novel apparatus to produce boards from plant fibers which are of essentially uniform density throughout.

THE DRAWING

These and other objects will become apparent from the following detailed description of a preferred embodiment thereof in connection with the accompanying drawings in which like numerals designate like elements and in which:

FIG. 2 is a plan view of a board forming portion of the mill depicted in FIG. 1;

FIG. 3 is a plan view of a fiber storage portion of the mill depicted in FIG. 1;

Figures 1, 6, 7:
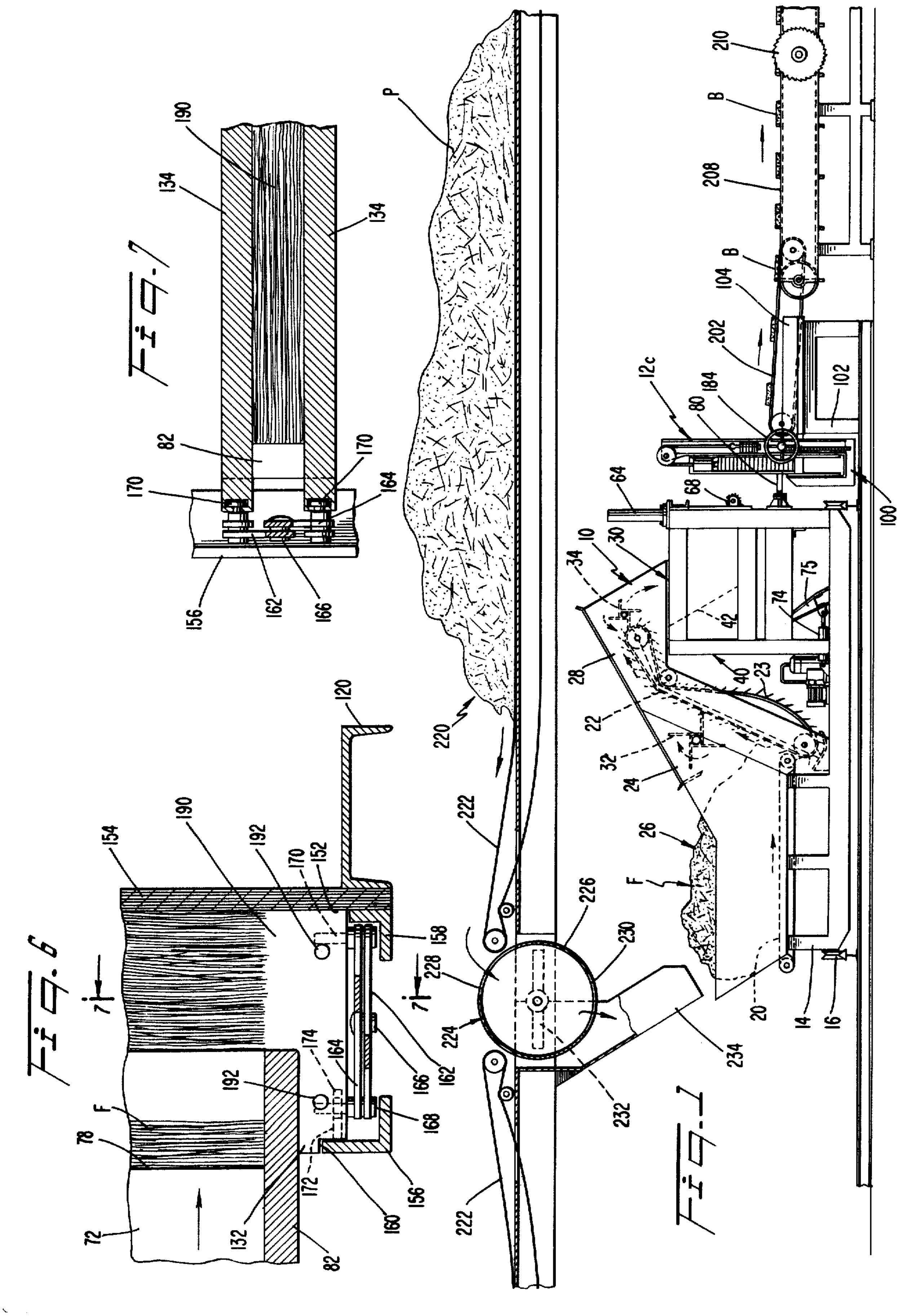
FIG. 1 is a side elevational view of a board forming mill according to the present invention.
Figure 4A:
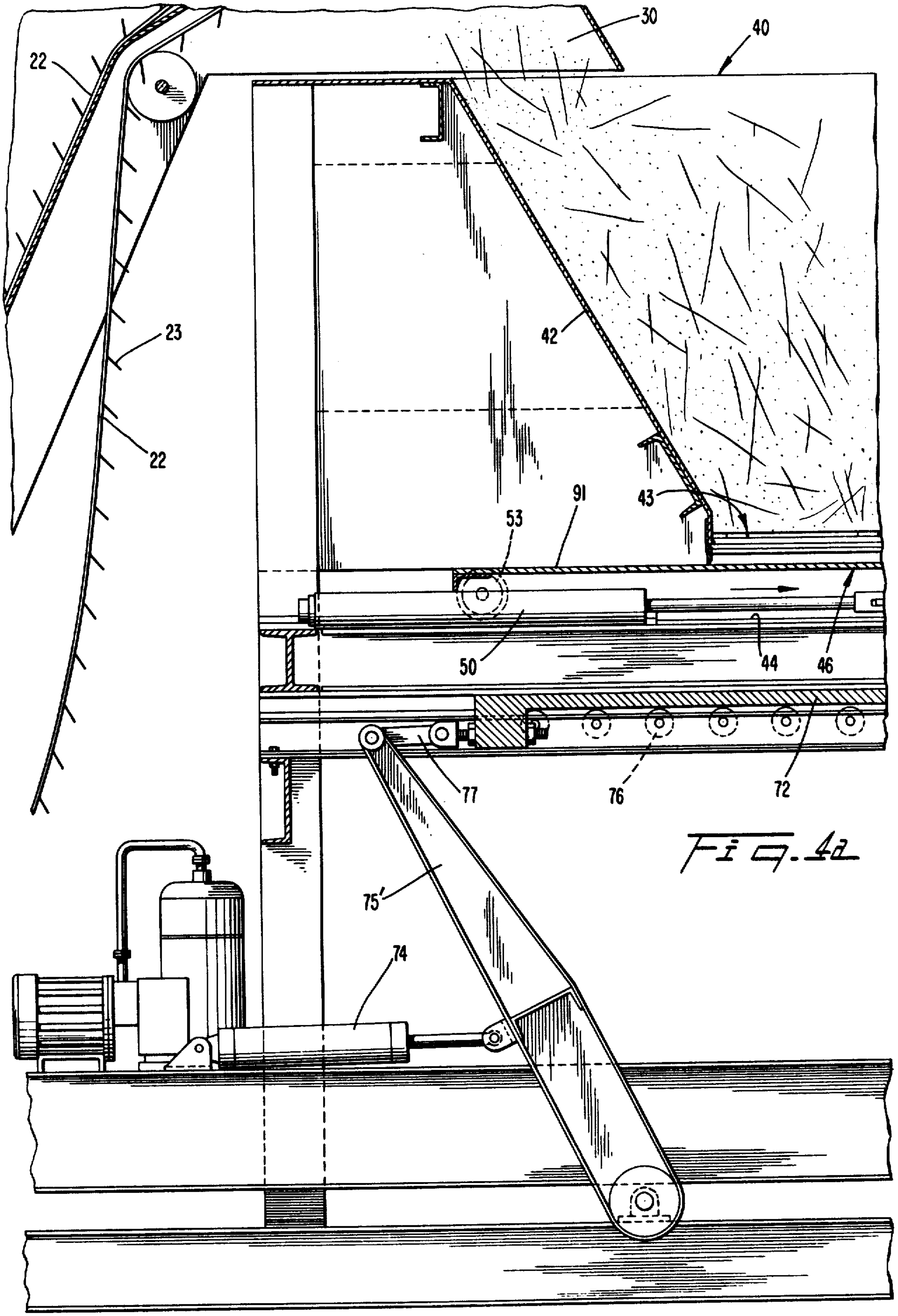
Figure 4B:
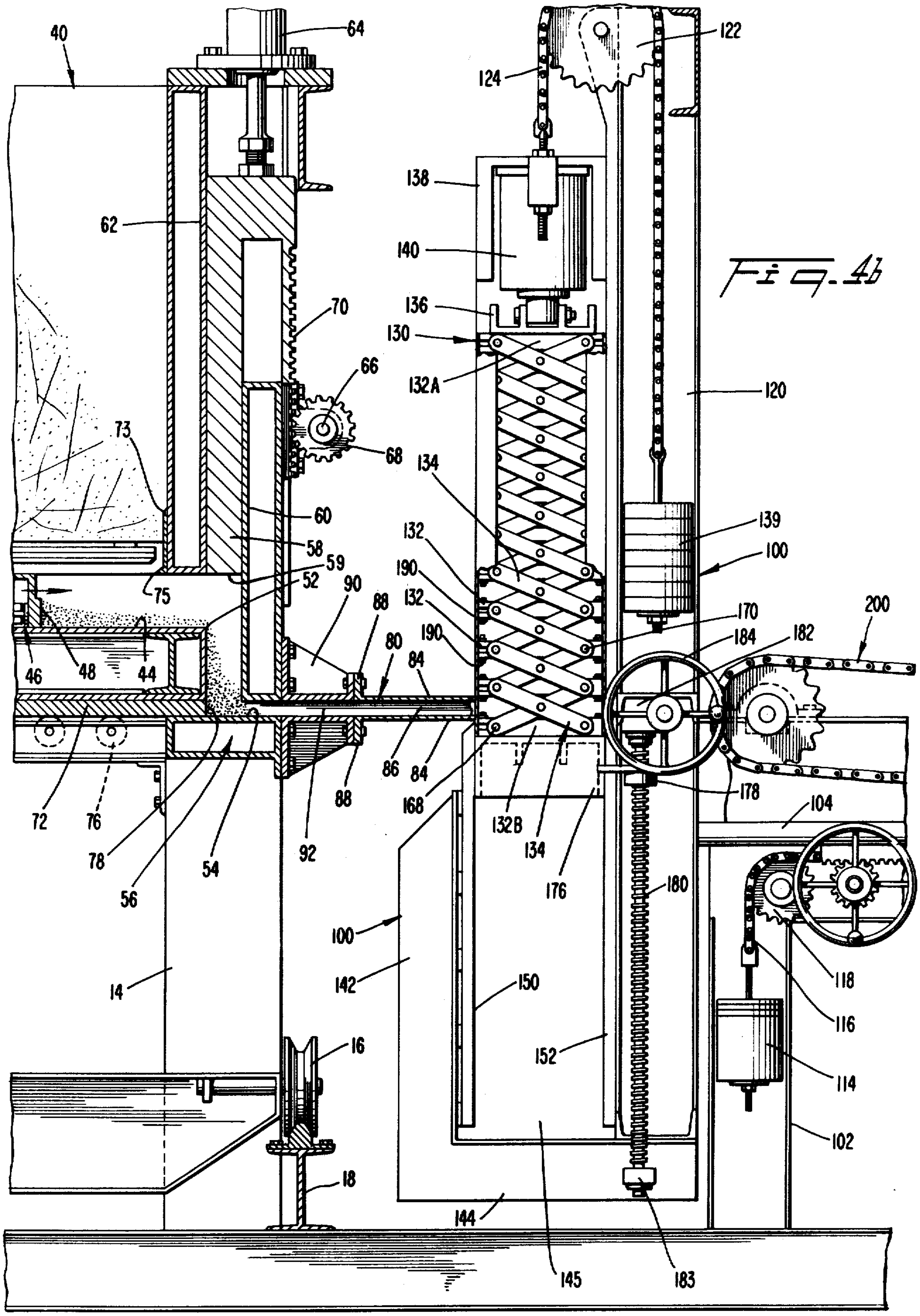
Figure 6:
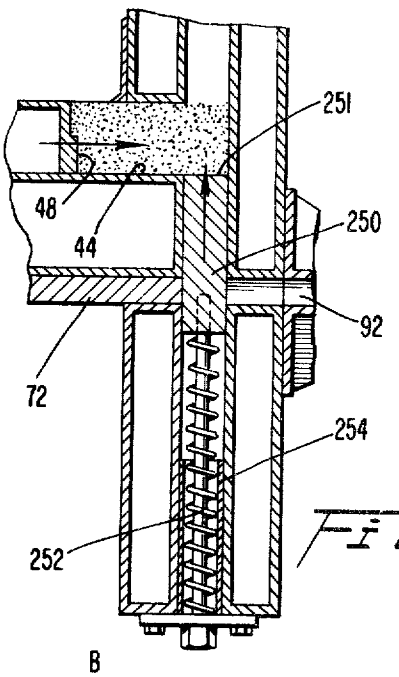
Figure 5:
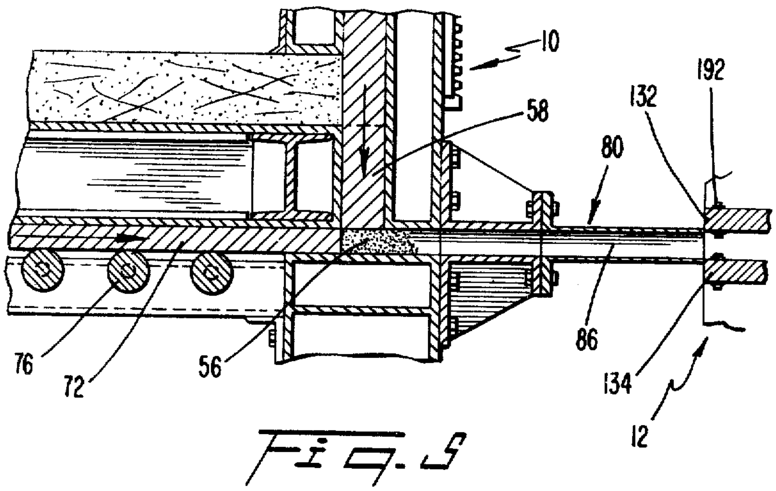
Figure 4C:
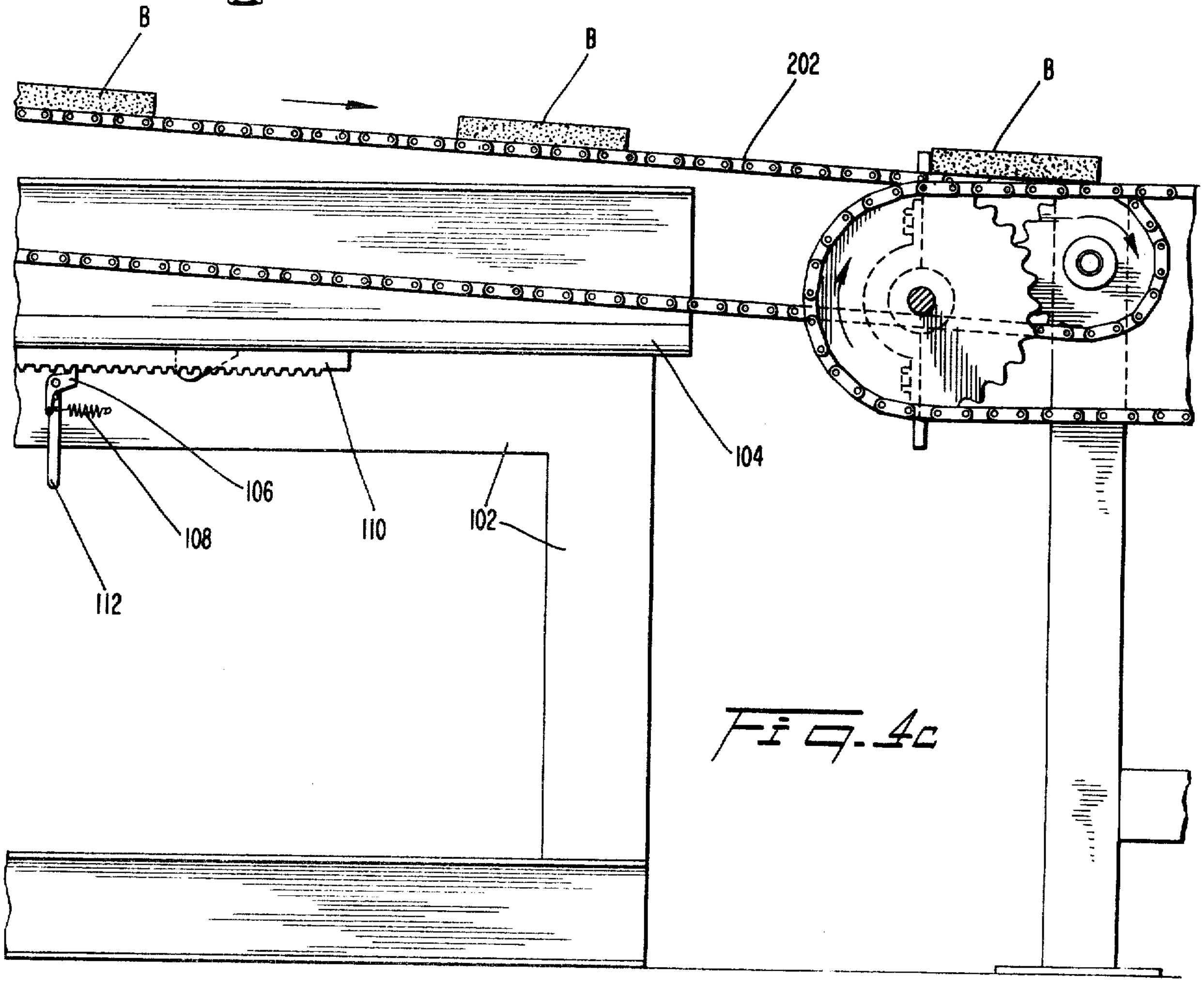
Figure 9:
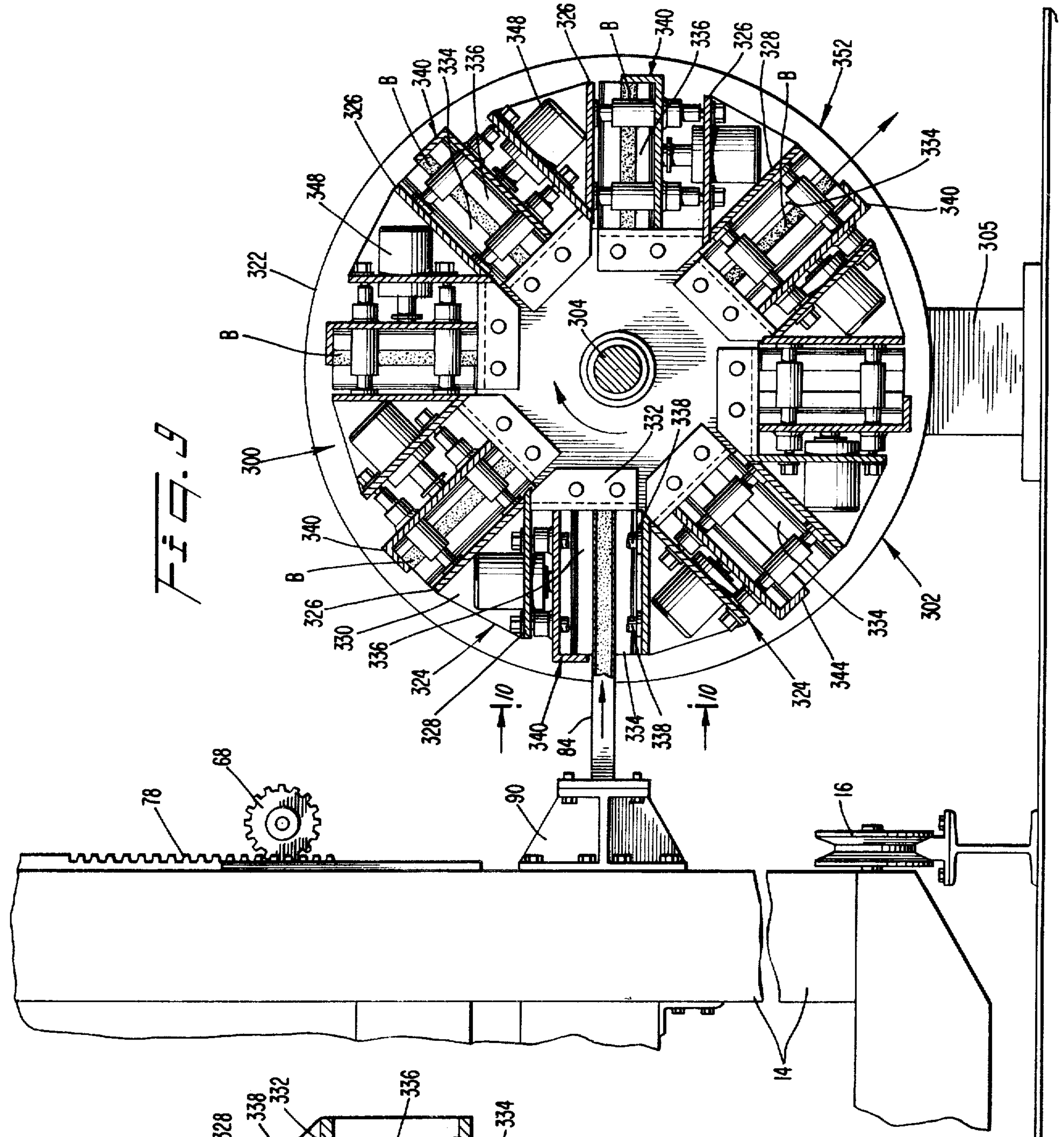
Figure 11:
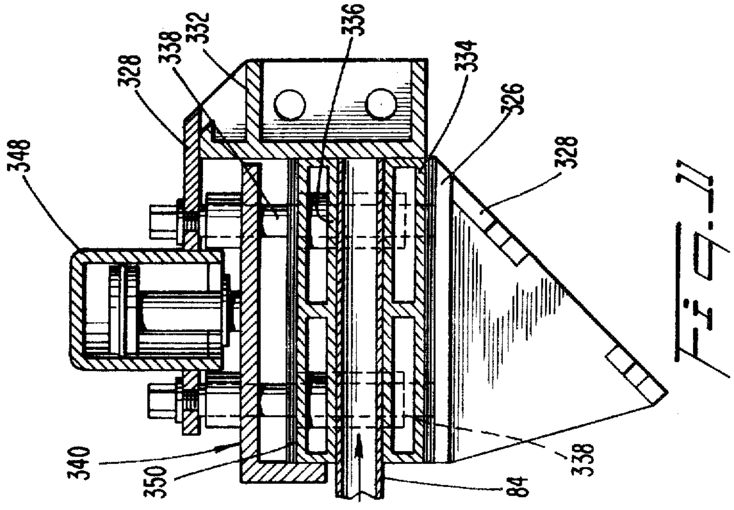

FIGS. 4*a*, 4*b*, and 4*c* are sections of a side elevational view with parts broken away, of a portion of the board forming mechanism, as fibers are being displaced by a sweep plunger;

FIG. 5 is an enlarged view of a compression zone of a forming station of the mill as a vertical plunger compresses fibers in the compression zone;

FIG. 6 is an enlarged plan view of a second horizontally reciprocal plunger delivering a slug of fibers into a chamber of a bonding station;

FIG. 7 is a cross-sectional view taken along line 7—7 in FIG. 6 after a nose assembly depicted in FIG. 6 has been withdrawn from the chamber of the bonding station and the horizontal plates of the chamber have converged to compress the fibers;

FIG. 8 is a fragmentary sectional view of an alternate embodiment of the forming station according to the present invention;

FIG. 9 is a side elevational view of an alternate form of bonding station with one of its end plates removed to expose the interior thereof in the direction of the axis of rotation;

FIG. 10 is a front view of one of the die openings of FIG. 9, taken in the direction 10—10 of FIG. 9;

FIG. 11 is a sectional view of one of the die openings of the bonding station of FIG. 9 being filled with the platens thereof in a separated condition;

FIG. 12 is a view similar to FIG. 11 after the opening has been filled and the rotary drum has been rotated partways toward the next indexing position and the fiber cover plate has been partially moved toward a closed position; and FIG. 13 is a view similar to FIG. 12 after the cover plate has been moved to a closed position.

BRIEF SUMMARY OF THE PREFERRED EMBODIMENTS OF THE INVENTION

A mobile forming station is provided which orients fibers and compresses them into slugs. A plurality of bonding stations each include a plurality of chambers selectively positionable in alignment with an ejector of the forming station to receive slugs of fibers. Once the chambers are filled with slugs the fibers are heated so that a bonding substance borne by the fibers sets and bonds the fibers together. The forming station is movable relative to the bonding stations so that as the slugs at one bonding station cure, another bonding station is serviced.

The chambers are defined by vertically spaced platens which are vertically movable as a unit to sequentially align the chambers with the ejector of the forming station. The platens can be converged to compress the slugs within the chambers.

The platens are mounted on a movable carrier which is displaced away from the forming station each time that a slug is inserted into the chamber and against a rear compression wall of the chamber. Means is provided for exerting a resistance to displacement of the carrier to intensify the compressive forces.

DETAILED DESCRIPTION OF THE PREFERRED EMBODIMENTS OF THE INVENTION

A preferred board forming mill according to the present invention comprises a mobile forming station 10 and a series of side-by-side bonding stations 12A, B, C (FIGS. 1 and 2). As will be explained subsequently in detail, plant fibers F are aligned and compressed in the form of slugs on the forming station 10 and are transferred to a respective bonding station 12 in which the slugs undergo final compression. Thereafter, the slugs are heat-treated at the bonding station 12 while the mobile forming station 10 advances to the next bonding station where the same sequence is repeated. In this fashion, a single forming station 10 efficiently services a series of bonding stations 12.

The present invention is adapted to handle and treat all suitable types of plant fibers such as wood, straw, and sugarcane, for example. The fibers are collected after being separated from the plant stalk in an essentially undamaged state cleaned, and preferably chopped to suitable length in any suitable fashion.

The mobile forming station 10 comprises a wheeled carriage 14, the wheels 16 of which are mounted for travel on parallel tracks 18 (FIG. 4*b*). The carriage 14 includes a rigid framework on which are mounted first and second power driven conveyors 20, 22. The first conveyor 20 comprises a horizontally oriented endless belt wrapped around a pair of rollers, one of which is driven by suitable drive means (not shown).

The second conveyor 22 is generally inclined relative to the first conveyor 20 and includes an endless belt wrapped around a pair of rollers one of which is driven by suitable drive means (not shown). Surrounding the conveyor 20, 22 is a fiber retaining wall unit 24 adapted to retain plant fibers for travel on the conveyors 20, 22. The retaining wall unit 24 defines a fiber bin 26 at its lower end, and includes a pair of inclined side walls 28 which form a discharge opening 30 at their upper ends. The second conveyor 22 includes a plurality of outwardly projecting spikes 23.

When the bin 26 contains fibers F and the conveyors 20, 22 are driven, the heap of fibers supported on the first conveyor 20 will be urged continuously against second conveyor 22. The spikes 23 will grab the fibers and convey them upwardly. The metering wheel 32, positioned a selected distance above the conveyor 22, kicks-back fibers disposed above the ends of the spikes. Thus, the second conveyor will carry a predetermined quantity of fibers once past the metering wheel. At the upper end of the second conveyor the fibers F are gravity discharged through the discharge opening 30, aided by the clearing wheel 34.

Located beneath the discharge opening 30 is a fiber receiving chute 40 (FIGS. 4*a*, 4*b*) which includes an inclined back wall 42. The lower end of the chute is fully open at 43. The chute 40 guides fibers F from the conveyor 22 onto a sweep table 44 located beneath the chute 40, the table 44 defining a fiber collection zone.

Mounted for horizontal reciprocal sliding movement along the sweep table 44 is a sweep plunger 46 which includes a sweep face 48 (FIG. 4*b*). A plurality of power rams 50 (only one shown in FIG. 4*a*) are connected to the sweep plunger 46 for horizontally reciprocating the latter. The rams 50 are preferably of the fluid actuated type, preferably hydraulic fluid.

The sweep plunger 46 travels toward and away from a forward edge 52 of the sweep table 44. Wheels 53 may be carried by the plunger 46 for facilitating its movement. Disposed beneath this edge 52 is a horizontal die wall 54 which defines a first compression zone 56. This compression zone 56 lies at the bottom of the travel path of a vertically reciprocating plunger 58 which is positioned to travel in a vertical direction toward and away from the first compression zone 56. The die wall 54 is spaced vertically from the edge 52 by a distance which is short enough to assure that a fiber leaning between the edge 52 and the wall 54 will not be oriented at more than 45° angle relative to horizontal.

Movement of the vertically reciprocal plunger 58 is guided by a pair of frame members 60, 62. A plurality of fluid rams 64 (only one shown) are mounted above the vertically reciprocating plunger for reciprocating the latter. The plunger 58 includes a face 59 which engages and somewhat compresses fibers in the first compression zone 56 as will be explained hereinafter. It should be noted that the face 59, and the compression zone 56, are of extended length, e.g., sixteen feet for example, for the production of boards of commercially acceptable length. Of course, this length can vary as desired.

In practice, fibers which have been swept from the sweep table 44 into the first compression zone 56 are somewhat vertically compressed by the vertically reciprocating plunger 58. During its vertical travel, the vertically reciprocating plunger 58 is guided to prevent misalignment. This is achieved by a rotatably mounted bar 66 which carries a plurality of fixed gears 68 (only one shown). Each gear is connected to a toothed rack 70 of the plunger 58 so that the gears 68 are rotated during up or down motion of the plunger 58. Since the gears 68 are both fixed to the bar 66, they must rotate in unison, thus assuring that the plunger 58 does not become skewed. Of course, alternative arrangements are available for achieving this result, such as the use of a synchronized hydraulic ram system for example.

Disposed on the frame member 62 is a cutting member 73 (FIG. 4*b*) whose cutting edge 75 lies just above the top of the sweep plunger 46. Thus, any fibers which extend above the plunger will be severed by the edge 75.

A second horizontal plunger 72 (FIG. 4*b*) is mounted for horizontal reciprocation in alignment with the first compression zone 56. A pair of fluid rams 74 (only one shown in FIG. 4*a*) are connected to the second horizontally reciprocating plunger 72 via a pivoted lever 75' and link 77 to effect such reciprocating movement. The second horizontally reciprocating plunger 72 includes a front face 78 operable to displace a vertically compressed slug of fibers from the first compression zone 56 and then horizontally compress the slug within a bonding station, as will be described subsequently.

Attached to the framework of the carriage 14 is a nose assembly 80 (FIG. 4*b*). The nose assembly 80 comprises a pair of upright side plates 82 and horizontal top and bottom plates 84 (FIGS. 4*b* and 6) which define a rectangular guide passage 86 through which the second horizontal plunger 72 travels. The nose assembly is attached by flanges 88 to a connector assembly 90 which is rigidly fastened to the framework of carriage 14 and forms a guide passage 92 in alignment with the nose passage 86 and first compression zone 56.

In practice, the conveyor 22 discharges fibers at a continuous, uniform rate which free-fall downwardly onto the sweep table 44. These fibers lie in generally randomly oriented condition ahead of the sweep face 48 of the sweep plunger 46. A predetermined quantity of fibers are deposited onto the table 44 (preferably a relatively shallow layer permitting portions of the table to be visible therethrough) before the fluid rams are extended in timed sequence to advance the sweep plunger 46. In so doing, the sweep face 48 sweeps the layer of fibers toward and over the edge 52 (FIG. 4*b*). The act of being swept toward the edge 52 causes the individual fibers F to become horizontally shifted toward an orientation generally parallel to the sweep face 48, e.g.

In this condition, the fibers F are swept off the edge 52 and into the first compression zone 56. The sweep plunger 46 includes a shelf 91 extending rearwardly from the sweep face 48 (FIG. 4*a*). This shelf 91 is sufficiently long to completely underlie the bottom of the chute 40 when the sweep plunger 46 is fully extended. In this manner, continuously supplied fibers from the conveyor 22 land upon the shelf 91 during advancement of the sweep plunger 46. Upon retraction of the sweep plunger 46, fibers collected on the shelf 91 fall from or are scraped from the shelf 91 and onto the sweep table 44. In practice, the fibers accumulate to a depth sufficient to assure that a full batch of fibers falls onto the table 44.

Following extension of the sweep plunger 4*b*, the vertically reciprocal plunger 58 is displaced downwardly by the rams 64. The compression face 59 of this plunger 58 engages the fibers and slightly compresses them vertically, tending to shift the fibers vertically toward a horizontal posture (FIG. 5). Thus, the fibers are now disposed generally parallel in substantially horizontal condition.

The second horizontally reciprocal plunger 72 is then extended to discharge the initially compressed slug of fibers from the forming station 10 and into a bonding or pressing station 12A, B, or C for further compression, as will be explained hereinafter.

Turning now to the bonding stations 12A, B, C, it will be appreciated that each bonding station comprises a carrier 100 (FIG. 4*b*) which is mounted on a stationary table 102 for movement in a direction toward and away from the forming station 10. This mounting is preferably achieved by positioning a rearward extension 104 of the carrier 100 on slide tracks which can be formed by rows of ball bearings (not shown). Of course, any suitable slide arrangement can be provided. A suitable one-way control mechanism is provided which assures that movement of the carrier 100 occurs only in a direction away from the forming station 10 during a board forming operation. For example, pawl 106 (FIG. 4*c*) pivoted on the table 102 is spring-biased by a spring 108 toward contact with a toothed rack 110 on the carrier 100. A release handle 112 is provided in conventional fashion for releasing the pawl 106 from the rack 110 at the end of a stroke, to be described, enabling the carrier to be returned to a start position. The pawl is free to pivot from engagement with the rack 110 against the force of spring 108 when sufficient force is applied to the carrier 100 in a direction away from the forming station 10, in a manner to be discussed.

A counterweight 114 (FIG. 4*b*) is carried at one end of a chain 116 which is wrapped around a sprocket wheel 118 on the table 102, the other end of the chain 116 being anchored to the carrier 100. In this fashion, the counterweight 114 provides a predetermined resistance against shifting of the carrier and determines the intensity of fiber compression as will be explained.

At its front end the carrier 100 includes a pair of spaced uprights 120 (only one shown) which carries a pair of sprocket wheels 122 (only one shown). Mounted on the carrier 100 for vertical movement relative thereto is a platen assembly 130. The platen assembly comprises a plurality of vertically spaced platens 132 connected together by criss-crossing linkages 134. The uppermost platen 132A is connected to a bar 136, the latter being connected to a beam 138 by means of a plurality of power rams 140 (only one shown), preferably in the form of hydraulic rams.

The beam 138 is connected to one end of a chain 124, and a counterweight 139 is carried at the other end of the chain. The weight 139 is selected to somewhat counterbalance the weight of the platen assembly 130 so that the latter can be more easily raised and lowered by a mechanism to be described.

Rigidly carried at the lower ends of the uprights 120 is an L-shaped wall structure which includes an upright wall 142 and a horizontal wall 144. The wall members 120, 142, 144 form a trough 145 for receiving the platen assembly 130 as will be discussed. Mounted on inside portions of the wall 142 and the uprights 120 are forward and rearward surfaces 150, 152 which extend the entire length of the trough. These surfaces are formed by laminated plates 154 (FIG. 6) so that the distance between the surfaces 150, 152 can be precisely determined. The forward surfaces 150 terminates upwardly at a level below that of the nose 80 of the forming station 10, whereas the rearward surface 152 extends thereabove.

Fastened to and extending upwardly from the front and rear plates 154 are pairs of front and rear L-brackets 156, 158 (FIG. 6). These brackets, four in number, define the corners of a vertical compartment within which the platen assembly 130 travels. The platens 132 each include notched corners 160 for guidingly receiving the front brackets 156. Lower portions of the brackets 156, 158 are removed in FIG. 4*b* to more fully expose the platens 132 for viewing.

As depicted more clearly in FIG. 6, the criss-crossing linkage 134 comprises links 162, 164 which are pivotably connected together at their midpoints by a pin 166, and at their ends by front pins 168 and rear pins 170. The front and rear pins 168, 170 are received in openings formed in end walls of the platens 132. The openings 172, which receive the front pins 168, are elongated to define slots, allowing the front pins 168 to travel horizontally. Rollers 174 are provided at the ends of the front pins 168 to facilitate such horizontal travel.

The lowermost platen 132B is mounted on a beam 176 which is vertically slidable within the trough 145. Extending laterally from an end of the beam 176 is a threaded traveler nut 178 which receives a worm screw 180. The worm 180 is rotatably mounted at its upper and lower ends within bearings 182, 183 in the upright 120 and the wall 144. Bearing 182 includes a drive transmission gearing for rotating the worm 180 in response to rotation of a manually rotatable wheel 184. Upon rotation of the worm 180, the beam 176, and thus the platen assembly 130 (including the beam 138 and the fluid cylinders 140) is raised or lowered relative to the carrier 100 via the traveler nut 178.

It will be realized that adjacently disposed platens 134 form a rectangular chamber 190 therebetween, and that by vertically displacing the platen assembly 130 via the hand wheel 184, the chambers may be sequentially brought into alignment with the nose 80 of the forming station 10. The nose 80 is of such length that it extends into the chamber essentially to the rear surface 152 when the carrier 100 is closest to the forming station 10.

In a raised condition of the platen assembly and with the fluid rams 140 retracted, as depicted in FIG. 4*b*, the bottom-most pair of platens 134 are vertically spaced a predetermined distance to form a rectangular chamber adapted to receive the nose 80 and compressed slugs of fibers from the forming station. Each time that a slug is inserted into the chamber, the slug is guided by the walls of the nose during its travel within the chamber, since the nose extends into the chamber up to the previously inserted slug.

In FIG. 4*b* the mill is depicted in a condition wherein the carrier 100 is furthest away from the forming station 10. By releasing the pawl 106 as previously discussed, the carrier can be displaced toward the forming station, whereby the nose 80 enters and travels to the end of the chamber 190.

By suitable actuation of the forming station 10, slugs of fibers are ejected through the nose 80 by the second horizontally reciprocable plunger 72 and into the chamber 190 (FIG. 6). The plunger 72 horizontally compresses the fibers of the slug against the surface 152, whereby there occurs further orienting of the fibers parallel to the longitudinal axis of the chamber 190. Each time that a slug is injected, the compression force of the plunger 72 displaces the carrier 100 away from the forming station by a constant incremental distance against the bias of the counterweight 114. In this fashion, the counterweight 114 determines the intensity of the horizontal compression. The distance by which the carrier 100 is shifted is commensurate with the thickness of the compressed slug. Thereafter another slug is injected against the first slug and the carrier is again displaced. Eventually, the chamber is completedly filled with slugs and at that point the carrier 100 has been displaced sufficiently to remove the nose 80 from the chamber.

Thereafter, the hand wheel 184 is rotated to lower the platen assembly 130 and bring the next chamber 190 into alignment with the nose 80. At this point, the pawl 106 can be released and the carrier 100 returned to a start position to fill the chamber.

After all of the chambers have been filled, the platen assembly 130 will have been lowered into the trough 145. By then extending the power rams 140, the platens 132 are displaced closer to one another so as to vertically compress the fibers and thereby further orient the fibers horizontally. The front and rear edges of the fiber units are retained against the surfaces 150, 152 to produce a smoothened condition for these edges. A plurality of threaded stop bolts 192 are positioned in each platen. These bolts project into the chamber and abut against an adjoining platen during extension of the rams 140 to determine the extent of compression of the fiber units.

The fibers have preferably been precoated with a bonding agent, such as powdered phenolic resin. This agent can be applied to the fibers in the form of a liquid, or solid powder. The platens 132 are of a conventional nature in which fluid passages are provided for the circulation of hot liquid or steam to heat the platen surfaces. In so doing, the fibers in the chambers are heated and the bonding agent melts and solidifies to bond the fibers together in a unified condition. Bonding may be aided by natural bonding substance indirectly carried by the fibers, and which also melts and rehardens.

As the heating steps are performed, the forming station 10 is advanced to the next bonding station 12B along the tracks 18, whereupon the above-described steps are repeated. This can be achieved by hand, or a suitable drive mechanism for the forming station can be provided, such as drive motor for one of the wheels 16, or a drive chain located beneath the forming station.

After such curing has been completed, the platen assembly 130 is raised by the hand wheel 184 and the rams 140 are retracted to unclamp the finished boards. Accordingly, the boards can be pushed rearwardly from the chambers (i.e., pushed from the left in FIG. 4*b* to be ejected to the right) between the uprights 120.

A suitable conveying mechanism 200 is disposed on the ejection side of the platen assembly 130 to receive the boards. The conveyor mechanism 200 may comprise green chain conveyor 202, or slides 204 (FIG. 2) which conduct the boards rearwardly. The slides 204 conduct the boards to a transverse conveyor belt 206 which transport the boards to a main discharge conveyor belt 208 which is aligned with the green chain conveyor 202. Suitable rotary saws 210 (FIG. 1) can be provided on opposite sides of the main discharge conveyor 208 to cut-off the rough ends of the boards. The severed end pieces 212 fall onto a transverse conveyor 214 (FIG. 2) for removal.

Fibers to be delivered to the forming station 10 are stored thereabove in a storage area 220 (FIG. 1). Conveyor belts 222 travel between piles P of fibers (FIG. 3) and feed into a common mixing zone 224. Fibers can be loaded onto the conveyors 222 for transport to the mixing zone. The mixing zone 224 comprises a drum 226 having an entrance opening 228 and a discharge opening 230 therein. The aforementioned bonding agent is preferably combined with the fibers within the drum. A rotary mixing action of the drum with the opening 230 closed-off mixes the bonding agent and fibers together. A chute 234 lies beneath the discharge opening 232 and above a location corresponding to the position of the bin 26 of the forming station 10 when the latter lies opposite the bonding station 12B (FIG. 2). When the fibers have been sufficiently rotated, the opening 230 is uncovered to allow coated fibers to fall into the bin 26 to refill the latter.

IN OPERATION, the forming station 10 is positioned in front of a bonding station 12A, with the nose assembly 80 of the former disposed within the lowermost chamber 190 of the latter. A batch of randomly oriented fibers on the table 44 is pushed off the edge 52 of that table by the sweep plunger 46 and into the first compression zone 56. During travel toward the edge 52, the fibers tend to become oriented parallel to the face 48 of the sweep plunger 46.

Next, the vertical plunger 58 is lowered to slightly vertically compress the fibers toward a horizontal posture, thus forming a compressed slug of fibers.

Following the vertical compression of a slug at the first compression zone 56, the second horizontally reciprocable plunger 72 displaces the slug into the chamber 190 of the platen assembly 30 and against an upper extension of the surface 152. In so doing, the slug is horizontally compressed between the face of the plunger 72 and the surface 152, so as to further orient the fibers parallel to the longitudinal board axis. The intensity of this compression is determined by the weight of the counterweight 114, since the carrier 100 will be displaced away from the forming station 10 after the compression forces of the plunger 72 exceed the force of the counterweight.

These steps are repeated until the chamber 190 is filled, whereupon the hand wheel 184 is operated to lower the platen assembly and bring a new chamber 190 into alignment with the nose 80 of the forming station. The pawl 106 is released and the carrier 100 is displaced toward the forming station 10 to insert the nose 80 into the next chamber. New slugs are formed and inserted into the chamber.

Once all of the chambers 190 have been filled, the rams 140 are extended to vertically compress the fibers between the platens 130. Thus, a final orienting of the fibers toward a horizontal orientation takes place.

The platens are then heated to set the bonding agent carried by the fibers. As this occurs the forming station 10 is advanced to service the next bonding station 12B.

After the bonding agent has hardened, the platen assembly 130 is raised from the surfaces 150, 152, the rams 140 are retracted to unclamp the boards, and the boards are pushed from the chambers.

The formation of boards is achieved efficiently since one or more bonding stations can be serviced by the forming station as fibers in other bonding stations are heated and cooled.

An alternative embodiment of the invention is depicted in FIG. 8 wherein a reciprocable element 250 is mounted in alignment with the vertically reciprocable plunger 58. This element 250 includes a face 251 which defines the die wall of the compression zone 56. The element 250 is biased by a compression spring 252 to an upward position wherein the face 251 is aligned with the sweep table 44, as depicted in FIG. 8. Hence, as fibers are pushed from the edge 52 by the sweep plunger, no "falling" of the fibers is involved, thereby preventing any chance of some fibers leaning between the die wall and the edge 52. The vertically reciprocable plunger 58 includes fingers at its outer ends (not shown) beyond opposite ends of the slug which contact the element 250 after the fibers have been slightly compressed by the plunger 58, thereby forcing the element 250 downwardly. A fixed stop 254 is positioned below the element 250 to terminate downward movement of the latter when the face 251 is aligned with the lower wall 84 of the nose. In this position, the second horizontally reciprocable plunger 72 is extended to dispense the slug. Thereafter, the plungers 72, 58 are retracted and the element 250 is returned upwardly to its rind-receiving position by the spring 252.

An alternative preferred embodiment of the bonding station is illustrated in FIGS. 9–13. The bonding station 300 disclosed therein comprises a rotary carrier drum 302 which is mounted for rotation about a horizontal axle 304. The axle 304 extends axially beyond the drum ends. The drum 302 comprises axially opposed end plates 322 to which are rigidly mounted a series of circumferentially spaced beams 324. Each beam 324 is generally V-shaped and includes a first longitudinal plate 326, a second longitudinal plate 328 forming an acute angle relative to the first plate 326, and a series of reinforcing webs 330. The plates 326, 328 and webs 330 are rigidly fastened together, as by welding for example. The end-most webs 330 are bolted to the end plates 322 so as to be rotatable therewith.

Extending between the second beam 328 of one beam 324 and the first beam 326 of an adjacent beam 324 is a back plate 332. The back plates 332 may be fastened to the first and second plates or directly bolted to the end plates 322.

Seated on each of the first plates 326 is one platen 334 of a pair of platens 334, 336. The other platen 336 is movably mounted relative to the one platen 334 and is guidingly supported on a pair of pins 338, the latter extending between the second plate 328 of one beam and the first plate 326 of an adjacent beam. The movable platen 336 contains openings which receive the pins 338.

Also guidingly supported on the pins 338 is a fiber cover plate 340. This cover plate 340 includes a main body portion 342 which contains openings aligned with openings in the movable platen 336 and through which the pins 338 extend, a front flange 344 angled 90° relative to the main body portion, and end retaining flanges 346 which function as stops to retain the movable platen 336. It will be understood that the fiber cover 340 is mounted for limited relative movement relative to the movable platen 336. Mounted on each of the second plates 328 and situated between the webs 330 are longitudinally spaced fluid rams 348. The rod ends of the rams 348 are connected to the main body portion 342 of the fiber cover 340.

A suitable drive mechanism is provided to rotatably index the drum 302 about the axle 304 and thereby sequentially align each pair of platens 334, 336 with the nose 80 of the forming station 80. In such a position, the pawl 106 is released to enable the drum to be displaced toward the nose, whereby the nose 84 enters the chamber between the platens 334, 336. Accordingly, slugs of fibers can be inserted into the chambers in the manner discussed earlier. During this insertion operation, the backing plate 332 acts as the wall against which the initial slug is forced.

After the chamber has been filled with the slugs the indexing mechanism is activated to rotate the drum. Concurrently, the rams 348 are extended, thereby lowering the fiber cover 340 and the movable platen 336. When the movable platen 336 contacts the slugs it stops, and the fiber cover 340 continues downwardly such that the outer end of the chamber becomes closed by the front flange 344. The closing of the cover 344 and indexing of the drum are performed such that the outer end of the chamber is continuously blocked either by the nose 80, the second horizontally reciprocable position 72, or the front flange 344. Thus, the fibers are maintained within the confines of the chamber so that a smooth board edge is formed.

After the front flange 344 has closed the chamber, the main body portion 342 of the cover 340 engages the movable platen 336 and urges the latter against the slugs. By thus converging the platens 334, 336, a final reorienting of the fibers takes place and the slugs are compacted to the desired density. Adjustable shims 350 are provided atop the movable platen 336 to determine when the compression begins and thus to regulate the amount of slug compaction which occurs before the ram 348 bottoms out. Of course, other devices could be utilized to perform the same function.

At this point, the fibers are heated by heated platens in a manner similar to that discussed earlier to melt and set the resinous binder substance. The curing step takes place while the next platen chamber is being filled, thereby eliminating unproductive periods while curing occurs. When the curing is completed (such as when the platens are situated in station 352), the platens are separated and the board falls out by gravity.

In the embodiment of FIGS. 9 to 13 the platens may be maintained continuously hot since there is no danger of early set-up of the binder. That is, in the embodiment described in conjunction with FIGS. 4, 4*b*, the lowermost chamber of the platen assembly is not closed until all chambers have been filled. If the platens were heated continuously, then some early set-up of the binder might occur before the slugs are subjected to final compression. Such a problem is not present in the embodiment described in connection with FIGS. 9–13 because a set of platens are converged immediately after the associated chamber has been filled. The arrangement of FIGS. 9 to 13 eliminates the need for a movable forming station and a plurality of bonding stations since an empty chamber is always present in the rotary platen drum following each filling operation.

It will be appreciated that the present invention provides a highly efficient and effective board forming mechanism. Lost production time due to the curing period is avoided in the embodiment described in connection with FIGS. 4*a*, 4*b* since the forming station travels to a subsequent bonding station while the boards of a previous bonding station cure. In the rotary drum embodiment, the independently closable platens enable curing to be effected immediately following the filling of each chamber.

Alignment of the fibers is effectively achieved by all embodiments of the invention due to the plurality of separate realigning steps, first by the sweep plunger, next by the vertical plunger, thereafter by the second horizontally shiftable plunger against the rear surface of the bonding station, and finally by the platens as they are converged.

The movable carrier 100 or 302 enables the amount of the horizontal compression forces at the bonding station to be adjusted to regulate the density of the boards. Moreover, it will be appreciated that the distance which each slug travels, before being ejected from the nose 80 is identical. Thus the degree of compacting of the slugs which results from frictional engagement thereof with surrounding walls, is identical for each slug. This assures a uniform density of a board throughout its width.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. Apparatus for forming plant fibers into boards comprising:
   means for delivering plant fibers in random orientation, said fibers bearing a binder substance;
   means for compressing and reorienting said fibers for forming slugs thereof in which said fibers are oriented in substantially parallel relationship;
   chamber forming means forming a plurality of chambers for receiving and compressing the slugs;
   means for discharging a plurality of said slugs one at a time for said slug forming means into one of said chambers;
   said discharging means including plunger means which enters said chamber as said plunger means pushes a slug thereinto, to compress each slug as said slug is inserted into said chamber; and
   means for sequentially aligning said chambers with said discharging means so that said discharging means successively fills each chamber with slugs, said binder substance being solidified in each chamber as the slugs in each chamber are compressed by said chamber forming means to bond the binder substance and fibers within each chamber to form a board of unified fibers within each chamber.

2. Apparatus according to claim 1, including a plurality of spaced platens forming said chambers, said aligning means comprising means for moving said platens to sequentially align said chambers with said discharging means; and further comprising means for converging said platens to compress fibers in said chambers.

3. Apparatus according to claim 1, wherein said discharging means includes a guide tube positionable within a chamber as it is filled with slugs, said plunger means comprising a reciprocable plunger for pushing slugs through said guide tube and into said chamber.

4. Apparatus according to claim 1, wherein said chamber forming means being mounted on a carrier, said carrier being mounted for displacement away from said discharge means in response to insertion of a slug into said chamber.

5. Apparatus according to claim 4, including means for exerting adjustable resistance forces on said carrier to regulate the density of fibers inserted into said chamber.

6. Apparatus according to claims 2, 3, or 4, wherein said plurality of platens comprises a plurality of pairs of platens; and means connected to each pair of platens for converging each pair of platens independently of the other pairs of platens so that fibers in one chamber may be compressed and cured while another chamber is filled.

7. Apparatus according to claim 2, wherein said converging means comprises means for simultaneously converging said platens to simultaneously compress the slugs in all of said chambers.

8. Apparatus according to claim 2, including means for closing front and rear sides of each chamber so that longitudinal edges of boards which are formed are smooth.

9. Apparatus according to claim 1, wherein said slug forming means comprises a first horizontally reciprocal plunger for sweeping a batch of randomly oriented fibers toward a first zone in a manner tending to orient such fibers so that vertical planes containing said fibers are disposed substantially parallel to one another; and a vertically reciprocal plunger for compressing the fibers in said first zone in a manner tending to orient the fibers substantially horizontally; said plunger means of said discharging means comprising a second horizontally reciprocal plunger for transferring such compressed fibers into one of said chambers in a manner further tending to orient the fibers such that vertical planes containing the fibers are generally parallel.

10. Apparatus for forming plant fibers into boards comprising:
   means for compressing and reorienting plant fibers for forming slugs thereof in which the fibers are arranged in selected orientation, including means for discharging the slugs;
   said discharging means including a tubular guide and a plunger movable therein;
   a carrier carrying a plurality of sets of platens, each set of platens forming a chamber, said chamber having a back wall;
   means for sequentially positioning said chambers in alignment with said tubular guide for receiving slugs from said plunger;
   one of said tubular guide and said carrier being movable toward and away from the other for positioning said tubular guide within a chamber prior to the insertion of slugs thereinto, said tubular guide and the back wall of said chamber being separable from one another in increments in response to the compression of each slug by said plunger within the chamber; and converging means for independently converging each set of platens when the chamber associated therewith is filled with slugs of fibers, to compress the slugs, whereupon a binder substance carried by the fibers is solidified in the chamber as the slugs in the chamber are compressed by said converging means to bond the binder substance and fibers within the chamber in a manner forming a board of united fibers while a subsequent chamber is being filled with slugs.

11. Apparatus according to claim 10, wherein said one of said tubular guide and said carrier which is movable relative to the other comprises said carrier; and further including means for applying adjustable resistance forces to resist movement of said carrier away from said tubular guide, to regulate the density of fibers in each chamber.

12. Apparatus according to claim 10, wherein said carrier comprises a rotatable drum, said sets of platens being spaced circumferentially around said drum, said positioning means comprising means for rotating said drum.

13. Apparatus according to claim 12, wherein each set of platens comprises two platens, one of which is stationary and the other of which is movable toward and away from said stationary platen; a cover including a front flange; said movable platen being retained in said cover, with said cover being movable toward said stationary platen relative to said movable platen by a limited distance; said converging means being connected to said cover to initially move said cover toward said stationary platen so that said frong flange closes the front end of the associated chamber, and thereafter said cover pushes said movable platen toward said stationary platen to compress fibers in the chambers.

14. Apparatus according to claim 13, wherein said converging means comprises a fluid ram connected to one platen of each pair of platens; said fluid rams being independently actuable.

15. Apparatus according to claim 10, wherein said forming means further comprises a first horizontally reciprocal plunger for sweeping a batch of randomly oriented fibers toward a first zone in a manner tending to orient such fibers so that vertical planes containing said fibers are disposed substantially parallel to one another, and a vertically reciprocal plunger for compressing the fibers in said first zone in a manner tending to orient the fibers substantially horizontally; said vertical planes being further positioned toward a parallel relationship when a slug is inserted into a chamber; and said fibers being further positioned toward a horizontal condition when said platens are converged.

16. Apparatus for forming plant fibers into boards comprising:

a forming station including:

means for discharging such slugs;

a plurality of bonding stations, each bonding station including a plurality of chambers selectively positioned in alignment with said discharging means to receive said formed slugs of fibers to be formed into said boards, means for compressing the slugs within the chambers, and means for heating said fibers whereby a curable bonding substance on the fibers melts and, upon subsequent cooling as the fibers are compressed, bonds the fibers together;

said forming station and said bonding stations being movable relative to one another so that said forming station inserts formed slugs into the chambers of one bonding station while the said bonding substance of a previously serviced bonding station is cured.

17. In an apparatus for forming plant fibers and a bonding agent into boards of the type including means for orienting the fibers substantially parallel to one another and for pushing such fibers into a chamber wherein a binder substance on the fibers is solidified while the fibers are compressed, to unite the fibers, the improvement wherein said orienting means comprises:

a first horizontally reciprocating plunger for sweeping a plurality of randomly oriented fibers to a first zone in a manner tending to orient such fibers so that the fibers are substantially parallel to a common reference surface;

a vertically reciprocating plunger for compressing the fibers in said first zone in a manner tending to orient the fibers substantially horizontally; and a second horizontally reciprocating plunger disposed below said first plunger for transferring such compressed fibers into the chamber.

18. Apparatus for forming plant fibers into boards comprising:

a forming station comprising:

a bin containing plant fibers;

means for conveying fibers from said bin to a discharge zone;

a surface defining a first zone disposed below said discharge zone for accumulating a mass of fibers discharged from said conveying means;

a first horizontally reciprocating plunger having a sweep face movable across said first zone;

a second zone located adjacent an end edge of said surface;

power means for horizontally shifting said first plunger to displace said fibers toward said end edge of said surface in a manner tending to reorient said fibers such that the fibers are disposed substantially parallel to said sweep face and discharge the fibers off said end edge into said second zone;

a vertically reciprocating plunger arranged above said second zone;

power means for vertically shifting said vertical reciprocating plunger downwardly into contact with fibers in said second zone in a manner tending to reorient said plant fibers substantially horizontally;

a second horizontally reciprocating plunger, including a compression face, movable across said second zone;

power means for horizontally shifting said second horizontally reciprocating plunger across said second zone to displace said fibers therefrom;

tubular guide means forming a passage for receiving and guiding said second horizontal reciprocating plunger;

a bonding station comprising:

a carrier;

a plurality of pairs of platens carried by said carrier, each pair of platens forming a chamber therebetween for receiving therein said guide means of said forming station so that fibers are pushed into said chamber by said second horizontally reciprocating plunger;

each chamber including a back wall against which wall, fibers are pushed;

power means for moving said platens to selectively position said chambers in horizontal alignment with said tubular guide means;

said carrier mounted for movement toward and away from said forming station and including releasable one-way control means permitting movement of said carrier away from said forming station during insertion of fibers into said chambers and preventing return movement of said carrier until released;

means for releasing said one-way control means to enable said carrier to be moved toward said guide means so that said guide means is positioned within a chamber;

power means for independently converging each pair of platens to compress fibers in the chamber thereof;

means for heating said platens to harden a binder substance carried by the fibers as the slugs are compressed by said converging means to bond the binder substance and fibers and thereby bond the fibers together, while subsequent chambers are being filled with fibers.

* * * * *